E. C. KERSEY.
WAVE MOTOR.
APPLICATION FILED JAN. 26, 1921.

1,408,094.

Patented Feb. 28, 1922.

INVENTOR
ENOS C. KERSEY
BY
*Hazard & Miller*
ATTORNEYS.

UNITED STATES PATENT OFFICE.

ENOS C. KERSEY, OF NEWPORT BEACH, CALIFORNIA.

WAVE MOTOR.

1,408,094. Specification of Letters Patent. Patented Feb. 28, 1922.

Application filed January 26, 1921. Serial No. 440,132.

*To all whom it may concern:*

Be it known that I, ENOS C. KERSEY, a citizen of the United States, residing at Newport Beach, in the county of Orange and State of California, have invented new and useful Improvements in Wave Motors, of which the following is a specification.

It is an object of this invention to provide a wave motor including hinged float members adapted to be moved relative to one another by the action of waves against the same. Suitable power converting mechanism upon one of the floats is connected by a link to an upright upon the other float in order that the relative hinged movement of the floats will operate said link so as to actuate the power converting mechanism.

The invention will be readily understood from the following description of the accompanying drawings, in which—

The wave motor comprises a plurality of float units hinged together and each having an operating connection between the same, and suitable power converting mechanism mounted upon another of the float units so that the movement of waves swinging the float units relative to one another will cause the operating connections to actuate the power converting means.

Figure 1:
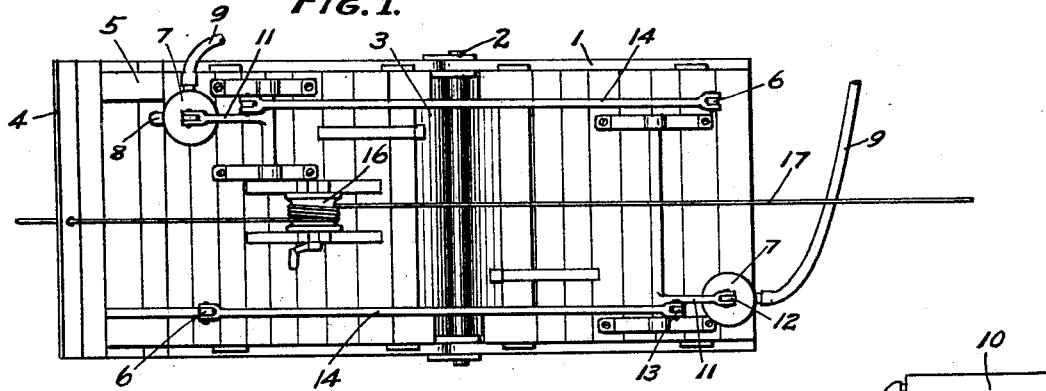
Figure 1 is a plan view of a wave motor constructed in accordance with the invention.
Figure 2:
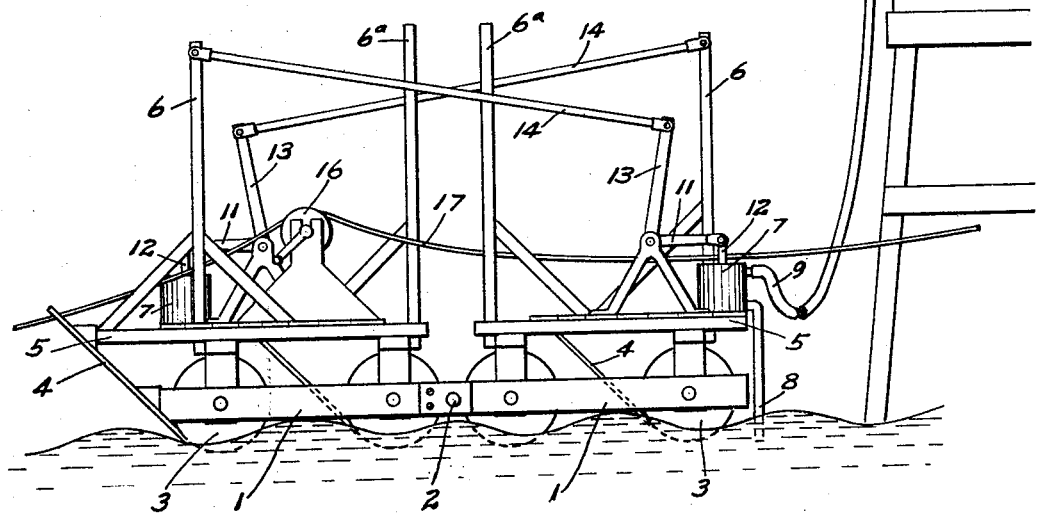
Fig. 2 is a side elevation of the same showing the connection between the wave motor and a suitable receiving tank upon the land.
Figure 3:
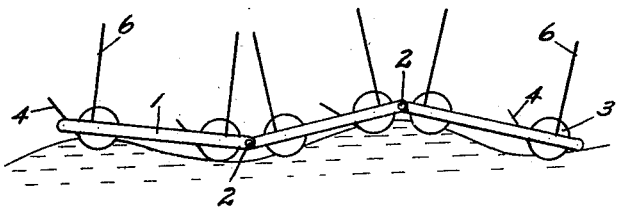
Fig. 3 is a diagram showing the operation of the wave motor.

In the specific embodiment of the invention illustrated in the drawings, I have shown a wave motor comprising units consisting of frames 1 hinged at their adjacent ends as shown at 2. There frames carry float drums 3 causing the motor to float upon the surface of the water and also providing means whereby the wave motor may be wheeled upon land. Inclined plates 4 extend upwardly from frames 1 so as to be impinged by the waves and thereby cause the float elements to pivot with relation to one another, as clearly shown in Fig. 3.

Auxiliary frames 5 are preferably carried by frames 1, and uprights 6 extend upwardly therefrom. A power converting mechanism is also mounted upon the frame 5, and in the present instance is shown as a water pump 7 having an intake pipe 8 extending below the surface of the water. The pump is provided with a discharge 9, and the water pumped by the wave motor is piped to a suitable receiving tank 10 upon the land and at such an elevation that water withdrawn therefrom will be under sufficient pressure to actuate any desired mechanism.

The operating means for pump 7 preferably includes a bell crank lever journaled upon frame 5 and having one arm 11 connected to the pump rod 12 and its opposite arm 13 connected to a link 14 which at its opposite end is secured to the upright 6 upon one of the other units of the wave motor. I have shown the links 14 as connecting upright 6 and lever arms 13 upon adjacent hinged units. If desired more than one of the uprights 6 may be mounted upon the frame of a unit, as shown at 6ª, these additional uprights being connected to pumps upon other units of the device in manner similar to that already described. In operation it will be understood that the relative hinged movement of the float units relative to one another will cause movement of links 14 and a consequent actuation of the bell crank levers and the pumps connected to the same.

A windlass 16 is preferably mounted upon the wave motor, and a cable 17 extending therefrom may be connected to the land at one end and suitably anchored beyond the wave motor at its opposite end in order to anchor the wave motor for limited movement, and also provide means whereby the device may be drawn to position upon the surface of the water and also returned to the land through actuation of the windlass.

Various changes may be made without departing from the spirit of the invention as claimed.

What is claimed is:

1. A wave motor comprising hinged floats including drums, inclined plates located adjacent to said drums, which plates are adapted to be impinged by waves, a power converting means upon one of said floats, and an operating link connecting said means and the other float.

2. A wave motor comprising hinged floats including drums, inclined plates located adjacent to said drums, which plates are adapted to be impinged by waves, a pump upon one of said floats, an upright upon the other float, and a link connecting said upright and said pump.

3. A wave motor including hinged floats including drums, inclined plates located adjacent to said drums, which plates are adapted to be impinged by waves, means for converting the power developed by the movement of said floats, a windlass upon the device, and an anchoring cable upon the same.

4. A wave motor comprising hinged floats including drums, inclined plates located adjacent to said drums, which plates are adapted to be impinged by waves, pumps upon said floats, uprights upon the same, and links connecting the uprights to the pumps upon other floats.

5. A wave motor comprising hinged frames, float drums upon the same forming wheeling means for the device when upon land, inclined plates secured to said frames adjacent to said drums, which plates are adapted to be impinged by waves, a power converting means upon one of said floats, and an operating link connecting said means and the other float.

6. A wave motor comprising hinged floats, said floats including revolubly mounted hollow drums, inclined plates arranged upon said floats adjacent to said drums for impingement by waves, a power converting means upon one of said floats, and an operating link connecting said means and the other float.

In testimony whereof I have signel my name to this specification.

ENOS C. KERSEY.